United States Patent
Goldberg et al.

[11] Patent Number: 6,058,364
[45] Date of Patent: May 2, 2000

[54] SPEECH RECOGNITION OF CUSTOMER IDENTIFIERS USING ADJUSTED PROBABILITIES BASED ON CUSTOMER ATTRIBUTE PARAMETERS

[75] Inventors: Randy G. Goldberg, Princeton; Richard R. Rosinski, Middletown; Roy Philip Weber, Bridgewater, all of N.J.

[73] Assignee: AT&T Corp., New York, N.Y.

[21] Appl. No.: 08/974,830

[22] Filed: Nov. 20, 1997

[51] Int. Cl.[7] .................................................. G10L 5/06
[52] U.S. Cl. ........................ 704/252; 704/240; 704/273
[58] Field of Search .................................. 704/240, 252, 704/273

[56] References Cited

U.S. PATENT DOCUMENTS

| | | | |
|---|---|---|---|
| 5,396,542 | 3/1995 | Alger et al. | 379/67.1 |
| 5,465,290 | 11/1995 | Hampton et al. | 379/88.02 |
| 5,539,635 | 7/1996 | Larson, Jr. | 364/479.04 |
| 5,719,921 | 2/1998 | Vysotsky et al. | 379/88.01 |
| 5,724,481 | 3/1998 | Garberg et al. | 704/243 |
| 5,832,063 | 11/1998 | Vysotsky et al. | 379/88.03 |

*Primary Examiner*—David R. Hudspeth
*Assistant Examiner*—Tālivaldis Ivars Šmits

[57] ABSTRACT

A speech recognition system recognizes a customer identifier received as a speech signal from a customer. The system generates a first plurality of customer identifier choices from the speech signal and a probability associated with each of the first plurality of choices. The system includes a database having stored thereon a plurality of customer attribute parameters indexed to a second plurality of customer identifier choices. The system queries the database using the first plurality of choices, and retrieves one or more customer attribute parameters from the database. The probabilities are adjusted by the system based on the retrieved customer attribute parameters. The customer identifier is then selected from the first plurality of choices based on the adjusted probabilities.

26 Claims, 2 Drawing Sheets

SPEECH RECOGNITION OF CUSTOMER IDENTIFIERS USING ADJUSTED PROBABILITIES BASED ON CUSTOMER ATTRIBUTE PARAMETERS

FIELD OF THE INVENTION

The present invention is directed to speech recognition. More particularly, the present invention is directed to speech recognition of a customer identifier using customer attribute parameters.

BACKGROUND OF THE INVENTION

Speech recognition systems are increasingly being used to translate human spoken words or utterances directly into its written equivalent and meaning. Speech recognition systems can avoid the need for these spoken words to be manually entered into a computer, or to be recognized by a human. Therefore, speech recognition systems are desirable for many businesses because they allow employees to perform other tasks.

One example of how a business can use a speech recognition system is for retrieving the identity of a caller over a telephone. Instead of requiring an employee to ask for and receive the caller's identification, known speech recognition systems can ask for a preassigned caller identifier and, using speech recognition techniques, translate the caller's utterance into the recognized identifier. The recognized identifier can then be used to perform a transaction.

However, one problem with known speech recognition systems is that they typically are not very accurate. Most speech recognition systems are likely to present multiple possible identifiers, sometimes referred to as "N-best" choices, one at a time to the caller in response to the caller's utterance. For each possible presented identifier, the caller must respond as to whether it is the correct identifier of the caller or not. As more and more incorrect identifiers are presented to the caller, the caller is likely to get frustrated and angry. If the caller is a customer or a potential customer of the business, the business may be reluctant to use the speech recognition system in order to avoid angering or frustrating a customer, especially a highly valued customer.

Based on the foregoing, there is a need for an improved speech recognition system for retrieving a customer identifier that is more accurate and/or is less likely to anger or frustrate highly valued customers.

SUMMARY OF THE INVENTION

One embodiment of the present invention is a speech recognition system for recognizing a customer identifier received as a speech signal from a customer. The system generates a first plurality of customer identifier choices from the speech signal and a probability associated with each of the first plurality of choices. The system includes a database having stored thereon a plurality of customer attribute parameters indexed to a second plurality of customer identifier choices. The system queries the database using the first plurality of choices, and retrieves one or more customer attribute parameters from the database. The probabilities are adjusted by the system based on the retrieved customer attribute parameters. The customer identifier is then selected from the first plurality of choices based on the adjusted probabilities.

DETAILED DESCRIPTION

Figure 1:
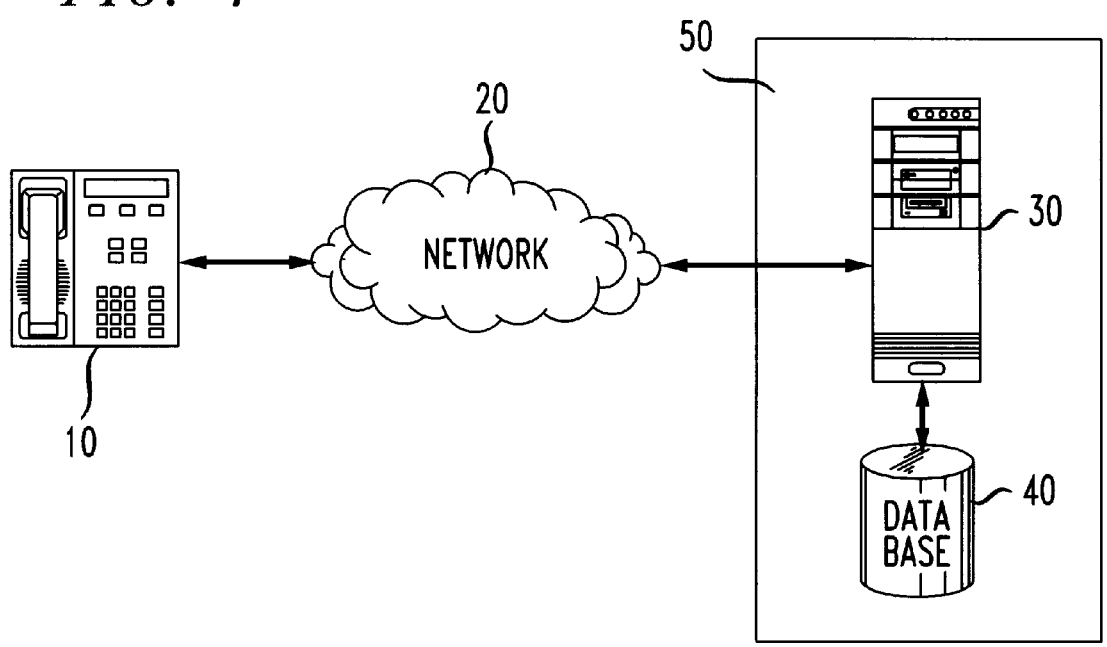
FIG. 1 is a block diagram illustrating a speech recognition system in accordance with one embodiment of the present invention.

FIG. 1 is a block diagram illustrating a speech recognition system 50 in accordance with one embodiment of the present invention. Speech recognition system 50 includes a general purpose computer 30 and a database 40.

Computer 30 includes a processor, memory (e.g., random access memory, read only memory, disk memory, etc.), and an analog-to-digital converter. Further, computer 30 has an interface to a customer. The interface can be a remote interface, such as a telephone line connection as shown in FIG. 1. The interface can also be a local interface, for example, a microphone and a speaker.

Computer 30 includes known speech processing software and hardware that receives a speech signal generated from human utterances and generates multiple choices of words that represent the utterances. For each choice of words, a probability that the choice of words is the correct choice of words is also generated by the speech recognition software.

In one embodiment, computer 30 utilizes a Hidden Markov Model to generate a list of "N-best" choices. An example of this method of speech recognition is disclosed in U.S. Pat. No. 5,241,619, herein incorporated by reference.

In another embodiment, computer 30 executes post-processing routines to generate multiple choices and associated probabilities for each choice. One example of such post-processing routines is disclosed in U.S. patent application Ser. No. 08/763,382, filed on Dec. 13, 1996 and entitled "Statistical Database Correction of Alphanumeric Account Numbers for Speech Recognition and Touch-Tone Recognition", herein incorporated by reference. Further, other known methods can be used by computer 30 to generate multiple choices of identifiers, and probabilities assigned to the identifiers.

Speech processing system 50 is intended to be used by a business that has a plurality of customers. In one embodiment, each customer is assigned a customer identifier. The term "identifier" refers to a string of characters that may comprise a plurality of letters, numbers, or both. One example of a customer identifier is a six digit identifier such as ZX147K. Another example of a customer identifier is the customer's phone number such as (908) 555-1234.

Speech processing system 50 further includes a database 40. Stored on database 40 is a plurality of customer attribute parameters indexed by customer identifiers or potential customer identifiers. For example, for each customer identifier of an existing customer, database 40 can store attribute parameters such as how frequently that customer makes purchases from the business (e.g., how many purchases in the past year, the past 2 years, etc.), the amount of money that the customer spends with the business each year, etc. Database 40 can also store attribute parameters indexed to all potential customers, including customers for which no specific attribute parameters have been entered into database 40. For example, if the customer identifiers are the customers' phone numbers, database 40 can store the average income per capita for each area code across the country. Therefore, any caller with a phone number will have attribute parameters stored in database 40 indexed to their customer identifier.

Included with each stored attribute parameter in database 40 is a multiplier or other adjustment factor. The multiplier, as will be described below, multiplies the probabilities assigned to each choice of identifiers generated by speech processor 30.

Speech recognition system 50 is remotely coupled to a customer on telephone 10 through a network 20. Network 20 can be any network that enables the customer at telephone 10 to dial into computer 30. For example, network 20 can be the Public Switched Telephone Network (PSTN), a local area network, the Internet, or an intranet. If computer 30 is used locally by the customer, network 20 and telephone 10 are not needed.

Figure 2:
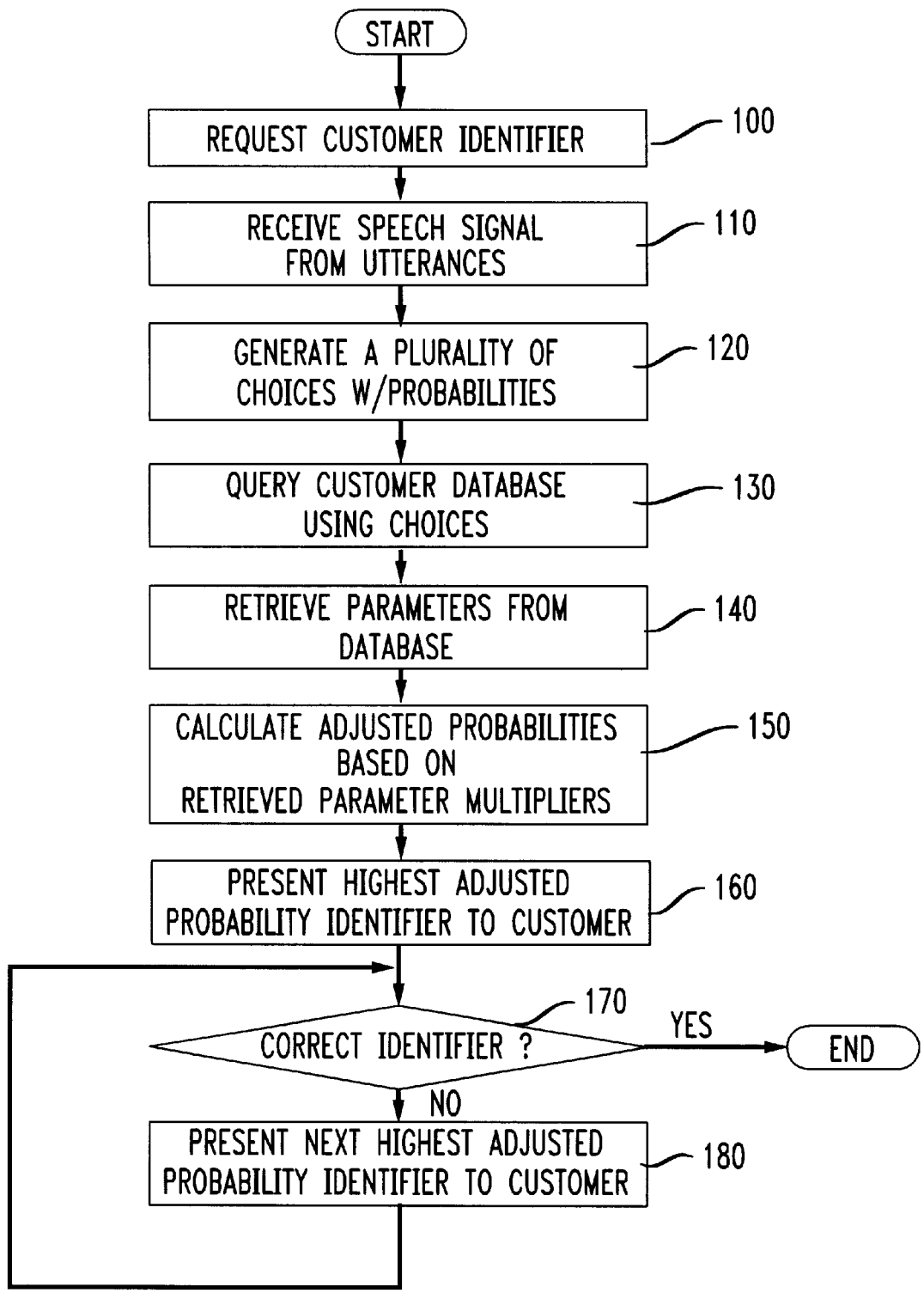
FIG. 2 is a flowchart illustrating the steps performed by the speech recognition system in accordance with one embodiment of the present invention.

FIG. 2 is a flowchart illustrating the steps performed by speech recognition system 50 when a customer dials the telephone number associated with computer 30 from telephone 10, or interacts with computer 30 locally. In one embodiment, the steps are executed by computer 30 and stored as software in the memory of computer 30. In other embodiments, the functions of the steps are performed using hardware, or a combination of hardware and software.

At step 100, computer 30 requests the customer identifier from the customer. This request can be in the form of a recorded or computer generated voice sent to the customer at phone 10, or in the form of a textual request if the customer is local to computer 30.

At step 110, computer 30 receives a speech signal generated by the customer's utterance in response to the customer identifier request. For example, the customer identifier "ZX147K" will be spoken by the customer if this is an identifier preassigned to the customer.

At step 120, computer 30 generates a plurality of choices of possible customer identifiers based on the received speech signal. These choices are generated using the speech recognition hardware and software previously discussed. Associated with each choice is a probability as to whether that choice is the correct identifier. Table 1 below is an example of some of the choices and associated probabilities that might be generated in response to the customer utterance of "ZX147K".

TABLE 1

| Customer Identifier Choices | Probabilities |
| --- | --- |
| ZS147J | .01 |
| BF047K | .008 |
| ZX147K | .005 |
| 3X147A | .002 |
| GS147A | .002 |

At step 130, computer 30 queries database 40 using the choices. Based on the query, attribute parameters indexed to some of the choices will be retrieved from database 40 at step 140. Attribute parameters may not be retrieved for all choices because, for example, some choices may not be in database 40. For example, if choice "3X147A" has not been assigned to a customer, it will not be found in database 40 if database 40 stores only existing customer identifiers. In that case, no attributes parameters will be retrieved from database 40 for "3X147A".

In one embodiment, the attribute parameters retrieved from database 40 have a multiplier or other adjustment factor included with them. In another embodiment, a multiplier or other adjustment factor can be determined from each attribute parameter from, for example, a look-up table or a predetermined calculation. The attribute parameters, through the adjustment factors, adjust the probabilities of the customer identifier choices. The adjustments increase the accuracy of speech recognition system 50 and/or make it more likely that a highly valued customer will be correctly identified sooner.

For example, if the attribute parameter is "frequency of customer purchase", the more frequently a customer makes purchases, the higher the multiplier will be that is included or determined from the attribute parameter for that customer. Likewise, if the attribute parameter is the "amount of money spent with the business", the greater the amount of money, the higher the multiplier will be for that attribute parameter.

Adjusted probabilities are generated by multiplying the original probability with the multipliers at step 150. Table 2 below shows the example of Table 1 with adjusted probabilities.

TABLE 2

| Customer Identifier Choices | Probabilities | Multipliers | Adjusted Probabilities |
| --- | --- | --- | --- |
| ZS147J | .01 | 1 | .01 |
| BF047K | .008 | 2 | .016 |
| ZX147K | .005 | 5 | .025 |
| 3X147A | .002 | 0 | .000 |
| GS147A | .002 | 3 | .006 |

In one embodiment, each multiplier has a value greater than one. Therefore, in this embodiment, multipliers can only increase the probability's. However, in another embodiment, multipliers can have any value greater then or equal to zero. Any multipliers less than one would therefore decrease the probability. Multipliers less than one can be used for undesirable customers. Further, a multiplier of zero can be used when a customer identifier is not found in database 40, such as with identifier "3X147A" in Table 2. In addition, more than one multiplier may be used to adjust the probabilities when multiple attribute parameters are indexed to each customer identifier in database 40.

At step 160, the customer identifier with the highest adjusted probability is presented to the customer (e.g., "ZX147K" in the example of Table 2). In addition, the customer is asked whether the presented customer identifier is the correct identifier. For example, using a computer generated voice, computer 30 can ask the customer "Is your customer identifier ZX147K? Say Yes or No."

At step 170, based on the response from the customer at step 160, computer 30 determines whether the presented customer identifier is the correct identifier. If it is, then speech recognition system 30 has successfully recognized the correct customer identifier and the process is completed.

However, if it is not the correct identifier, at step 180 the next highest adjusted probability customer identifier (e.g., "BF047K" in the example of Table 2) is presented to the customer. Steps 170 and 180 are repeated until the correct customer identifier is successfully recognized.

In one embodiment, speech recognition system 50 increases the customer identifier choice probabilities for more frequent customer when it uses "customer frequency" as a parameter. This can increase the accuracy of speech recognition system 50 because out of a choice of customer identifiers, it is more likely that the correct customer identifier is the one that identifies the most frequent customer.

Further, in another embodiment, speech recognition system 50 increases the customer identifier choice probabilities for highly valued customers that spend more money with the business. This increases the chances that the first few customer identifiers presented to the highly valued customers will be correct. Therefore, the highly valued customers will be less angry and frustrated because less incorrect customer identifiers will be presented to them.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of recognizing a customer identifier comprising the steps of:

(a) receiving a speech signal from a customer;

(b) generating a first plurality of customer identifier choices from the speech signal and a probability associated with each of the first plurality of choices;

(c) querying a database using said first plurality of choices, the database having stored thereon a plurality of customer attribute parameters indexed to a second plurality of customer identifier choices;

(d) retrieving one or more customer attribute parameters;

(e) adjusting the probabilities based on said retrieved customer attribute parameters; and (f) selecting the customer identifier from the first plurality of choices based on the adjusted probabilities.

2. The method of claim 1, wherein step (f) comprises the steps of:

(f-1) presenting a highest adjusted probability customer identifier choice to the customer; and (f-2) determining whether the presented highest adjusted identifier choice is correct.

3. The method of claim 2, wherein step (f) further comprises the steps of:

(f-3) presenting a next highest adjusted probability customer identifier choice to the customer;

(f-4) determining whether the presented next highest adjusted identifier choice is correct; and (f-5) repeating steps (f-3) and (f-4) if it is determined at step (f-4) that the next highest adjusted identifier choice is not correct.

4. The method of claim 1, wherein the plurality of customer parameters comprise a dollar amount of purchases for each of said second plurality of customer identifier choices.

5. The method of claim 1, wherein the plurality of customer parameters comprise a frequency of purchases for each of said second plurality of customer identifier choices.

6. The method of claim 1, wherein step (b) comprises using a hidden Markov Model to generate N-best choices.

7. The method of claim 1, wherein step (b) comprises the steps of:

(b-1) recognizing a first customer identifier; and (b-2) post-processing the first customer identifier to generate the first plurality of customer identifier choices.

8. The method of claim 1, wherein each of said plurality of parameters includes one or more adjustment factors.

9. The method of claim 8, wherein said one or more adjustment factors are one or more multipliers, and wherein step (e) comprises the step of multiplying the probabilities with the one or more multipliers.

10. The method of claim 1, wherein step (e) comprises the steps of:

(e-1) determining an adjustment factor; and (e-2) adjusting the probabilities using the adjustment factor.

11. The method of claim 10, wherein the adjustment factor comprises one or more multipliers, and wherein in step (e-1) the one or more multipliers are multiplied with the probabilities.

12. A speech recognition system for recognizing a customer identifier comprising:

a speech processing computer that generates a first plurality of customer identifier choices from a speech signal and a probability for each customer identifier choice; and a database coupled to said computer, said database having stored thereon a plurality of customer attribute parameters indexed to a second plurality of customer identifier choices;

wherein said speech processing computer selects one of the first plurality of customer identifier choices as said customer identifier based on the probabilities and one or more of said customer attribute parameters which adjust said probabilities.

13. The speech recognition system of claim 12, further comprising an interface to receive a speech signal from a customer.

14. The speech recognition system of claim 13, wherein said interface comprises a network and a telephone.

15. The speech recognition system of claim 13, wherein said interface comprises a microphone.

16. The speech recognition system of claim 12, wherein the plurality of customer parameters comprise a frequency of purchases for each of said second plurality of customer identifier choices.

17. The speech recognition system of claim 12, wherein the plurality of customer parameters comprise an amount of purchases for each of said second plurality of customer identifier choices.

18. An apparatus for recognizing a customer identifier comprising:

means for receiving a speech signal from a customer;

means for generating a first plurality of customer identifier choices from the speech signal and a probability associated with each of the first plurality of choices;

a database having stored thereon a plurality of customer attribute parameters indexed to a second plurality of customer identifier choices;

means for querying said database using said first plurality of choices;

means for retrieving one or more customer attribute parameters;

means for adjusting the probabilities based on said retrieved customer attribute parameters; and means for selecting the customer identifier from the first plurality of choices based on the adjusted probabilities.

19. The apparatus of claim 18, wherein said means for selecting comprises:

means for presenting a highest adjusted probability customer identifier choice to the customer; and means for determining whether the presented highest adjusted identifier choice is correct.

20. The apparatus of claim 19, wherein said means for selecting further comprises:

means for presenting a next highest adjusted probability customer identifier choice to the customer; and means for determining whether the presented next highest adjusted identifier choice is correct.

21. The apparatus of claim 18, wherein the plurality of customer parameters comprise a dollar amount of purchases for each of said second plurality of customer identifier choices.

22. The apparatus of claim 18, wherein the plurality of customer parameters comprise a frequency of purchases for each of said second plurality of customer identifier choices.

23. The apparatus of claim 18, wherein said means for generating comprises means for using a hidden Markov Model to generate N-best choices.

24. The apparatus of claim 18, wherein said means for generating comprises:

means for recognizing a first customer identifier; and means for post-processing the first customer identifier to generate the first plurality of customer identifier choices.

25. The apparatus of claim 18, wherein each of said plurality of parameters includes one or more multipliers.

26. The apparatus of claim 25, wherein said means for adjusting comprises means for multiplying the probabilities with the one or more multipliers.

\* \* \* \* \*